(12) United States Patent
Ma

(10) Patent No.: US 7,586,828 B1
(45) Date of Patent: Sep. 8, 2009

(54) MAGNETIC DATA STORAGE SYSTEM

(75) Inventor: Xiaoguang Ma, Albany, CA (US)

(73) Assignee: TiNi Alloy Company, San Leandro, CA (US)

( * ) Notice: Subject to any disclaimer, the term of this patent is extended or adjusted under 35 U.S.C. 154(b) by 694 days.

(21) Appl. No.: 10/972,759

(22) Filed: Oct. 25, 2004

Related U.S. Application Data (60) Provisional application No. 60/513,937, filed on Oct. 23, 2003.

(51) Int. Cl.
*G11B 9/00* (2006.01)
(52) U.S. Cl. .......................... 369/126; 369/173
(58) Field of Classification Search .................. None
See application file for complete search history.

(56) References Cited

U.S. PATENT DOCUMENTS

| | | |
|---|---|---|
| 368,425 A | 8/1887 | Ross et al. |
| 538,593 A | 4/1895 | Naylor, Jr. |
| 1,560,335 A | 11/1925 | Czochralski |
| 1,904,828 A | 4/1933 | Green |
| 1,926,925 A | 9/1933 | Wescott |
| 2,060,593 A | 11/1936 | Schaurte et al. |
| 2,371,614 A | 3/1945 | Graves et al. |
| 2,586,556 A | 2/1952 | Mullikin |
| 2,608,996 A | 9/1952 | Forman |
| 2,610,300 A | 9/1952 | Walton et al. |
| 2,647,017 A | 7/1953 | Coulliette |
| 2,911,504 A | 11/1959 | Cohn |
| 3,229,956 A | 1/1966 | White |
| 3,351,463 A | 11/1967 | Rozner et al. |
| 3,357,432 A | 12/1967 | Sparks |
| 3,400,906 A | 9/1968 | Stocklin |
| 3,408,890 A | 11/1968 | Bochman, Jr. |
| 3,445,086 A | 5/1969 | Quinn |
| 3,454,286 A | 7/1969 | Anderson et al. |
| 3,546,996 A | 12/1970 | Grijalva et al. |
| 3,561,537 A | 2/1971 | Dix et al. |
| 3,613,732 A | 10/1971 | Willson et al. |
| 3,620,212 A | 11/1971 | Fannon, Jr. et al. |
| 3,659,625 A | 5/1972 | Coiner et al. |

(Continued)

FOREIGN PATENT DOCUMENTS

EP 0053596 6/1982

(Continued)

OTHER PUBLICATIONS

US 5,772,989, 3/1998, Fitch et al. (withdrawn).

(Continued)

*Primary Examiner*—Wayne R Young
*Assistant Examiner*—Lixi Chow
(74) *Attorney, Agent, or Firm*—Shay Glenn LLP (57) ABSTRACT

A magnetic data storage system having a scanning tip array based system and a shape memory thin film-based data storage medium. Prior to storing data, the medium is in its non-ferromagnetic austenitic phase. Indentation stress locally induces martensitic transformation of the medium, which in turn generates a locally ferromagnetized surface. By measuring the magnetic force interaction between the tip and the medium surface, inscribed magnetic information can be read. The shape memory thin film enables the stress-induced local magnetic transition to provide a fast data storage system with high data storage density.

12 Claims, 8 Drawing Sheets

U.S. PATENT DOCUMENTS

| | | |
|---|---|---|
| 3,725,835 A | 4/1973 | Hopkins et al. |
| 3,789,838 A | 2/1974 | Fournier et al. |
| 3,849,756 A | 11/1974 | Hickling |
| 3,888,975 A | 6/1975 | Ramwell |
| 3,918,443 A | 11/1975 | Vennard et al. |
| 3,974,844 A | 8/1976 | Pimentel |
| 4,055,955 A | 11/1977 | Johnson |
| 4,063,831 A | 12/1977 | Meuret |
| 4,072,159 A | 2/1978 | Kurosawa |
| 4,096,993 A | 6/1978 | Behr |
| 4,176,719 A | 12/1979 | Bray |
| 4,177,327 A | 12/1979 | Mathews |
| 4,195,773 A | 4/1980 | Ogden |
| 4,243,963 A | 1/1981 | Jameel et al. |
| 4,265,684 A | 5/1981 | Boll |
| 4,279,790 A | 7/1981 | Nakajima |
| 4,340,049 A | 7/1982 | Munsch |
| 4,485,545 A | 12/1984 | Caverly |
| 4,501,058 A | 2/1985 | Schutzler |
| 4,524,343 A | 6/1985 | Morgan et al. |
| 4,549,717 A | 10/1985 | Dewaegheneire |
| 4,551,974 A | 11/1985 | Yaeger et al. |
| 4,553,393 A | 11/1985 | Ruoff |
| 4,558,715 A | 12/1985 | Walton et al. |
| 4,567,549 A | 1/1986 | Lemme |
| 4,585,209 A | 4/1986 | Aine et al. |
| 4,589,179 A | 5/1986 | Hulting, Jr. |
| 4,596,483 A | 6/1986 | Gabriel et al. |
| 4,619,284 A | 10/1986 | Delarue et al. |
| 4,654,191 A | 3/1987 | Krieg |
| 4,684,913 A | 8/1987 | Yaeger |
| 4,706,758 A | 11/1987 | Johnson |
| 4,753,465 A | 6/1988 | Dalby |
| 4,821,997 A | 4/1989 | Zdeblick |
| 4,823,607 A | 4/1989 | Howe et al. |
| 4,824,073 A | 4/1989 | Zdeblick |
| 4,848,388 A | 7/1989 | Waldbusser |
| 4,854,797 A | 8/1989 | Gourd |
| 4,864,824 A | 9/1989 | Gabriel et al. |
| 4,893,655 A | 1/1990 | Anderson |
| 4,896,728 A | 1/1990 | Wolff et al. |
| 4,943,032 A | 7/1990 | Zdeblick |
| 5,060,888 A | 10/1991 | Vezain et al. |
| 5,061,137 A | 10/1991 | Gourd |
| 5,061,914 A | 10/1991 | Busch et al. |
| 5,069,419 A | 12/1991 | Jerman |
| 5,072,288 A | 12/1991 | MacDonald et al. |
| 5,114,504 A | 5/1992 | AbuJudom, II et al. |
| 5,116,252 A | 5/1992 | Hartman |
| 5,117,916 A | 6/1992 | Ohta et al. |
| 5,119,555 A | 6/1992 | Johnson |
| 5,129,753 A | 7/1992 | Wesley et al. |
| 5,160,233 A | 11/1992 | McKinnis |
| 5,190,546 A | 3/1993 | Jervis |
| 5,192,147 A | 3/1993 | McCloskey |
| 5,211,371 A | 5/1993 | Coffee |
| 5,218,998 A | 6/1993 | Bakken et al. |
| 5,245,738 A | 9/1993 | Johnson |
| 5,309,717 A | 5/1994 | Minch |
| 5,312,152 A | 5/1994 | Woebkenberg, Jr. et al. |
| 5,325,880 A | 7/1994 | Johnson et al. |
| 5,344,117 A | 9/1994 | Trah et al. |
| 5,364,046 A | 11/1994 | Dobbs et al. |
| 5,494,113 A | 2/1996 | Polan |
| 5,502,982 A | 4/1996 | Venetucci |
| 5,543,349 A | 8/1996 | Kurtz et al. |
| 5,605,543 A | 2/1997 | Swanson |
| 5,619,177 A | 4/1997 | Johnson et al. |
| 5,622,225 A | 4/1997 | Sundholm |
| 5,640,217 A | 6/1997 | Hautcoeur et al. |
| 5,641,364 A | 6/1997 | Golberg et al. |
| 5,676,356 A | 10/1997 | Ekonen et al. |
| 5,695,504 A | 12/1997 | Gifford, III et al. |
| 5,714,690 A | 2/1998 | Burns et al. |
| 5,722,989 A | 3/1998 | Fitch et al. |
| 5,771,742 A | 6/1998 | Bokaie et al. |
| 5,772,378 A | 6/1998 | Keto-Tokoi |
| 5,796,152 A | 8/1998 | Carr et al. |
| 5,819,749 A | 10/1998 | Lee et al. |
| 5,825,275 A | 10/1998 | Wuttig et al. |
| 5,837,394 A | 11/1998 | Schumm, Jr. |
| 5,840,199 A | 11/1998 | Warren |
| 5,850,837 A | 12/1998 | Shiroyama et al. |
| 5,867,302 A | 2/1999 | Fleming |
| 5,903,099 A | 5/1999 | Johnson et al. |
| 5,924,492 A | 7/1999 | Kikuchi et al. |
| 5,930,651 A | 7/1999 | Terasawa |
| 5,960,812 A | 10/1999 | Johnson |
| 6,042,553 A | 3/2000 | Solar et al. |
| 6,072,617 A | 6/2000 | Henck |
| 6,073,700 A | 6/2000 | Tsuji et al. |
| 6,075,239 A | 6/2000 | Aksyuk et al. |
| 6,080,160 A | 6/2000 | Chen |
| 6,084,849 A * | 7/2000 | Durig et al. ............ 369/126 |
| 6,101,164 A * | 8/2000 | Kado et al. ............ 369/126 |
| 6,110,204 A | 8/2000 | Lazarov et al. |
| 6,124,523 A | 9/2000 | Banas et al. |
| 6,126,371 A | 10/2000 | McCloskey |
| 6,139,143 A | 10/2000 | Brune et al. |
| 6,195,478 B1 | 2/2001 | Fouquet |
| 6,203,715 B1 | 3/2001 | Kim et al. |
| 6,229,640 B1 | 5/2001 | Zhang |
| 6,247,493 B1 | 6/2001 | Henderson |
| 6,277,133 B1 | 8/2001 | Kanesaka |
| 6,284,067 B1 | 9/2001 | Schwartz et al. |
| 6,386,507 B2 | 5/2002 | Dhuler et al. |
| 6,406,605 B1 | 6/2002 | Moles |
| 6,407,478 B1 | 6/2002 | Wood et al. |
| 6,410,360 B1 | 6/2002 | Steenberge |
| 6,447,478 B1 | 9/2002 | Maynard |
| 6,451,668 B1 | 9/2002 | Neumeier et al. |
| 6,454,913 B1 | 9/2002 | Rasmussen et al. |
| 6,470,108 B1 | 10/2002 | Johnson |
| 6,475,261 B1 * | 11/2002 | Matsumoto et al. ........ 75/245 |
| 6,524,322 B1 | 2/2003 | Berreklouw |
| 6,533,905 B2 | 3/2003 | Johnson et al. |
| 6,537,310 B1 | 3/2003 | Palmaz et al. |
| 6,582,985 B2 | 6/2003 | Cabuz et al. |
| 6,592,724 B1 | 7/2003 | Rasmussen et al. |
| 6,605,111 B2 | 8/2003 | Bose et al. |
| 6,614,570 B2 | 9/2003 | Johnson et al. |
| 6,620,634 B2 | 9/2003 | Johnson et al. |
| 6,624,730 B2 | 9/2003 | Johnson et al. |
| 6,669,794 B1 | 12/2003 | Bellouard et al. |
| 6,669,795 B2 | 12/2003 | Johnson et al. |
| 6,672,502 B1 | 1/2004 | Paul et al. |
| 6,688,828 B1 | 2/2004 | Post |
| 6,729,599 B2 | 5/2004 | Johnson |
| 6,742,761 B2 | 6/2004 | Johnson et al. |
| 6,746,890 B2 | 6/2004 | Gupta et al. |
| 6,771,445 B1 * | 8/2004 | Hamann et al. ............ 360/59 |
| 6,790,298 B2 | 9/2004 | Johnson et al. |
| 6,811,910 B2 | 11/2004 | Tsai et al. |
| 6,840,329 B2 | 1/2005 | Kikuchi et al. |
| 6,843,465 B1 | 1/2005 | Scott |
| 6,908,275 B2 | 6/2005 | Nelson et al. |
| 6,920,966 B2 | 7/2005 | Buchele et al. |
| 6,955,187 B1 | 10/2005 | Johnson |
| 7,040,323 B1 | 5/2006 | Menchaca et al. |
| 7,084,726 B2 | 8/2006 | Gupta et al. |
| 7,201,367 B2 | 4/2007 | Wietharn |
| 2001/0023010 A1 | 9/2001 | Yamada et al. |
| 2002/0018325 A1 * | 2/2002 | Nakatani et al. ......... 360/324.2 |
| 2002/0062154 A1 | 5/2002 | Ayers |

| | | | |
|---|---|---|---|
| 2002/0106614 | A1* | 8/2002 | Prince et al. ................ 434/114 |
| 2003/0002994 | A1 | 1/2003 | Johnson et al. |
| 2003/0078465 | A1 | 4/2003 | Pai et al. |
| 2003/0170130 | A1 | 9/2003 | Johnson |
| 2004/0083006 | A1 | 4/2004 | Ellingsen |
| 2004/0200551 | A1 | 10/2004 | Brhel et al. |
| 2004/0243219 | A1 | 12/2004 | Fischer et al. |
| 2004/0249399 | A1 | 12/2004 | Cinquin et al. |
| 2006/0118210 | A1 | 6/2006 | Johnson |
| 2006/0213522 | A1 | 9/2006 | Menchaca et al. |
| 2007/0137740 | A1 | 6/2007 | Johnson et al. |
| 2007/0246233 | A1 | 10/2007 | Johnson |

FOREIGN PATENT DOCUMENTS

| | | |
|---|---|---|
| EP | 0310439 | 4/1989 |
| EP | 1122526 | 8/2001 |
| EP | 1238600 | 9/2002 |
| GB | 2187951 | 9/1987 |
| JP | 57161031 | 10/1982 |
| JP | 59179771 | 10/1984 |
| JP | 07090624 | 4/1995 |
| JP | 10173306 | 6/1998 |
| JP | 2000185999 A | 7/2000 |
| SU | 1434314 | 10/1988 |
| WO | WO 98/53362 | 11/1998 |
| WO | WO00/04204 | 1/2000 |
| WO | WO03/052150 | 6/2003 |
| WO | WO2005/108635 | 11/2005 |

OTHER PUBLICATIONS

Johnson, David et al.; U.S. Appl. No. 10/972,745 entitled "Non-explosive releasable coupling device," filed Oct. 25, 2004.

Johnson, David et al.; U.S. Appl. No. 11/006,501 entitled "Anastomosis device and method," filed Dec. 6, 2004.

Johnson, David et al.; U.S. Appl. No. 11/041,185 entitled "Single crystal shape memory alloy devices and methods," filed Jan. 24, 2005.

Johnson, David; U.S. Appl. No. 11/396,234 entitled "Tear-resistant thin film methods of fabrication," filed Mar. 31, 2006.

Johnson, David; U.S. Appl. No. 11/415,885 entitled "Eyeglass frame," filed May 2, 2006.

Johnson, David; U.S. Appl. No. 11/420,157 entitled "Shape memory allow thin film, method of fabrication, and articles of manufacture," filed May 24, 2006.

Johnson, David; U.S. Appl. No. 11/526,138 entitled "Constant load bolt," filed Sep. 22, 2006.

Johnson, David; U.S. Appl. No. 11/859,697 entitled "Constant load fastener," filed Sep. 21, 2007.

I. E.Viahhi; Robototechnic Constructions Based On CU-AL-NI Single Crystal Actuators; Proceedings of Second International Conference on Shape Memory and Superelastic Technologies; 1997; United States.

Pauling, Linus, College Chemistry, second edition, W.H. Freeman and Company, San Francisco, 1955, pp. 81-91.

Buchaillot L. et al., "Thin film of titanium/nickel shape memory alloy for multi-degree of freedom microactuators", Seisan Kenkyu, vol. 51, No. 8, 1999, pp. 22-23.

Johnson A. D. et al., "Application of shape memory alloys: advantages, disadvantages, and limitations", Micromachining and Microfabrication Process Technology VII, Oct. 4-22, 2001, San Francisco, CA, USA, vol. 4557, 2001, pp. 341-351.

Takabayashi et al., "Reversible shape memory alloy film fabricated by RF sputtering", Materials and Manufacturing Processes, vol. 13, No. 2, 1998, pp. 275-286.

Martynov, V., "TiNi thin films for microactuators and microdevices: sputter deposition and processing techniques", Thermec' 2003, Internat'l Conf. on Processing and Manufacturing of Advanced Materials, Jul. 7-11, 2003, Leganes, Madrid, Spain, Materials Science Forum, Jul. 7, 2003 vol. 426-432; pp. 3475-3480.

Johnson, David et al.; U.S. Appl. No. 11/948,852 entitled "Method of alloying reactive elemental components," filed Nov. 30, 2007.

Johnson, David et al.; U.S. Appl. No. 11/949,663 entitled "Hyperelastic shape setting devices and fabrication methods," filed Dec. 3, 2007.

Johnson, David et al.; U.S. Appl. No. 12/019,553 entitled "Frangible shape memory alloy fire sprinkler valve actuator," filed Jan. 24, 2008.

Johnson, Alfred David; U.S. Appl. No. 12/182,119 entitled "Method and devices for preventing restenosis in cardiovascular stents," filed Jul. 29, 2008.

Antonov et al.; New advances and developments in the Stepnakov method for the growth of shaped crystals; Crystallography Reports; vol. 47; Suppl. 1; 2002; pp. S43-S52.

ElastametTM brochure from New Discovery Metals; 2007.

ElastametTM website screen capture, accessed Jul. 23, 2008.

Fu et al.; The growth characteristics with a shape memory effect; J. Phys.: Condens. Matter; vol. 4; 1992; pp. 8303-8310.

Qingfu et al.; Stabilisation of martensite during training of Cu-Al-Ni single crystals; Journal de Physique IV; Collloqu C2; Supplement to the Journa de Physique III; vol. 5; Feb. 1995; pp. 181-186.

Recarte et al.; Influence of Al and Ni concentration on the martensitic transformation in Cu-Al-Ni shape-memory alloys; Metallurgical and MaterialsTransactions A; vol. 33A; Aug. 2002; pp. 2581-2591.

Sittner et al.; Stress induced martensitic transformations in tension/torsion of CuAlNi single crystal tube; Scripta Materialia; vol. 48; 2003; pp. 1153-1159.

Zhang et al.; The variant selection criteria in single-crystal CuAlNi shape memory alloys; Smart Mater. Struct.; vol. 9; 2000; pp. 571-581.

Zhdanov et al.; Thermal stresses in tubes, produced from a melt by the Stepanov method, during their coiling; Journal of Engineering Physics and Thermophysics; vol. 68; No. 1; 1995; pp. 80-89.

\* cited by examiner

MAGNETIC DATA STORAGE SYSTEM

CROSS-REFERENCE TO PRIOR APPLICATION

This application claims the benefit under 35 USC §119(e) of U.S. provisional application Ser. No. 60/513,937 filed Oct. 23, 2003.

BACKGROUND OF THE INVENTION

1) Field of the Invention

This invention relates in general to mass data storage systems, and in particular relates to magnetic data storage systems of large storage density.

2) Description of the Related Art

Mass storage devices for information technology are now mainly carried out by magnetic data storage (hard disks, magnetic tapes, etc) using the spin of electrons in ferromagnetic materials. These are expected to have a booming market of more than $15×10^9$ by 2005. Over the past decade, the data storage density in a magnetic memory device has been increasing by more than 60% annually. However, there is a physical limit to sustain this trend. In conventional recording, each data bit comprises numerous grains to maintain a high signal-to-noise ratio and grain size is reduced in order to obtain higher data storage density. Unfortunately, small thermal energy alone can trigger random magnetic switching of the grains when the grains size becomes too small. This is the well-known superparamagnetic limit. It has been predicted that superparamagnetic effects will limit the densities of current longitudinal magnetic medium to about 100 Gbit/in$^2$. Therefore, it is urgent to find an alternative approach to increase the data storage density. Since the early 1990's, researchers have been trying to take advantage of the ultra-high resolution of scanning probe microscope (SPM) for data storage application.

SPM technology, specifically atomic force microscope (AFM) and scanning tunneling microscope (STM), has been proven to be capable of storing information by thermo-mechanically indenting medium with planar surfaces in a nanometer scale. Among the ongoing worldwide projects of ultra-high capacity memory, "Millipede" of IBM seems to be the most promising one. In "Millipede", thousands of tip/cantilever assemblies are integrated on a single silicon chip to serve as writing/reading heads. During writing, the tips are heated up to ~400 and penetrates into plastic medium to create a nanometer-size indents. For reading, the hot tips (~300) act as the parallel reading heads and the data are retrieved by measuring the heat flux between individual tips and the plastic medium. Erasing is achieved by locally heating the plastic to ~150 until it flows and fills the indent. The write-read speed and the data storage density are eventually determined by the number of tip assemblies and the tip size, respectively. The SPM based data storage system described above is hopeful to bring tremendous data storage capacity to laptops, cell phones and other mobile devices. However, several technique problems still need to be solved before it can become a commercial product. First of all, the "Millipede" system still runs very slowly, especially its reading rate is limited by the complex measurement of the heat flux. Secondly, controlling heating on a nanometer scale is inherently difficult. Also wear and corrosion of the plastic medium will significantly affect the duration of memory medium. In view of these disadvantages, there is a strong need for improved medium and storage concepts to be used in SPM based storage systems.

Shape memory alloy (SMA) materials are known for their reversible martensitic phase transformation. The transition temperature required for SMAs to recover a large strain is usually below 100° C.; the transition temperature can be varied by selection of the composition of the alloying metals, thereby enhancing the design flexibility. Comparing to a plastic material, SMAs also offer better mechanical properties, such as long-term stability and corrosion resistance.

A typical prior art SMA-based data storage medium is disclosed in the Durig et. al. U.S. Pat. No. 6,084,849. That patent discloses the use of the shape memory effect (SME) for the writing, reading, and erasing of data. However, the data rate is limited by the slow heat flux measurement. The Durig et. al. patent discloses that local heating of an area on the medium can alter its electronic properties. Further, Durig et. al. explains that these locally altered areas can be detected or read by using an STM tip for sensing the tunneling current between the medium and tip.

SUMMARY AND OBJECTS OF THE INVENTION

A new magnetic data storage system is achieved by the provision of a storage system comprising a scanning tip array system and an austenite shape memory thin films (SMTFs) based data storage medium which are suitably manipulated such that data can be recorded by mechanically forming indents in the SMTFs. The transformation from austenite (non-ferromagnetic phase) to martensite (ferromagnetic phase) in the SMTFs occurs due to external indentation-induced stress and the magnetic field freezing phenomenon in external magnetic field will generate a locally ferromagnetized surface. This magnetic information recorded near the indents in the SMTFs can be read by measuring the magnetic force interaction between the tips and the medium surface. Information can be erased from the new storage medium by applying strong AC magnetic field or locally heating the SMTFs layer above its transition temperature.

In is a general object of the present invention to provide a magnetic data storage system having a large storage density.

It is a further object of the invention to provide a new and improved magnetic data storage medium and a new and improved storage concept for storing, retrieving and erasing from such a storage medium.

DETAILED DESCRIPTION OF THE INVENTION

Shape Memory Alloys (SMAs) are a group of materials that undergo diffusionless martensite phase transformation between two equilibrium lattice configurations known as austenite (parent undeformed phase which is stable at high temperatures) and martensite (deformed phase that dominates at low temperatures). Due to their unique properties of pseudoelasticity and shape memory effect, SMAs are widely applied in many fields. For non-ferromagnetic SMAs, the martensitic transformation underlying the shape memory effect is triggered by means of tuning temperature or/and mechanical stress. However, for ferromagnetic shape memory alloys (FSMAs) the martensitic transformation can be induced not only by changing the temperature and stress, but also by adjusting an applied magnetic field. External magnetic field can induce large strain up to 10% of ferromagnetic martensite by a twin rearrangement, and inversely, a change of magnetization can be caused by external strain. To date, several groups of FSMAs have been studied such as $Ni_2MnGa$, $Ni_2MnAl$, Fe—Pd, $Fe_2Pt$ and Ni—Co—Al systems. The striking coupling of FSMAs among temperature, mechanical stress and magnetism, i.e. the increase in stress or magnetism is equivalent to the decrease in transition temperature, gives people an invaluable flexibility to control and design materials.

Heusler alloy $Ni_{53}Mn_{25}Ga_{22}$ was found to experience a reverse martensite transformation from ferromagnetic martensite to paramagnetic austenite. During the phase transformation, the atomic lattice of $Ni_2MnGa$ alloy is distorted from tetragonal to cubic with a change in Mn interatomic distance, which causes the intrinsic magnetic properties of the alloy to change. Experimental results of Ni—Co—Al SMAs show dramatic change of magnetization value caused by martensitic transformation from the paramagnetic parent phase to the ferromagnetic martensite phase. The Curie temperatures and the martensitic start temperatures of $\beta$ phase in the range of 120-420° K can be independently obtained by adjusting the composition of the Ni—Co—Al alloys. Similar martensitic transition also found to coincide with the ($\beta+\lambda$)-phase transition of Ni—Co—Al SMAs. Other FSMAs, i.e. Ni—Ga—Fe and Co—Ni SMAs, also shows magnetization change during phase transition. The temperature-stress-magnetism coupling property was also observed for materials undergoing martensitic transformation. It is found that magnetization of Ni—Mn—Ga ferromagnetic martensite change linearly with the compressive strain. It is well known that paramagnetic austenitic steels undergo a martensitic phase transformation under a change of temperature or mechanical load. When mechanical stress is applied to paramagnetic austenitic steel, a phase-transformation from paramagnetic austenite to ferromagnetic martensite occurs, which in turn generates a locally ferromagnetized surface. This local magnetism transition gives the materials the capability to memorize the localized stress-induced data distribution on their surfaces. By using proper indentation and magnetic force sensing system, we can realize the writing process by locally inducing ferromagnetic martensite phase in the paramagnetic austenitic matrix and the reading process by measuring the local magnetization change.

The high mechanical stress induced by indenting an austenitic SMAs (non-ferromagnetic phase) can locally trigger martensitic transformation, which in turn generates a nanometer-sized ferromagnetized domain. Since the magnetic response accompanying martensitic transformation is much faster than thermal response of conventional SPM based data storage medium, it is promising to develop a SMAs based magnetic data storage medium.

Due to its large market ($50×10^6$ for TiNi alone and large application potential), the fabrication of both bulk and thin film SMAs has become a highly matured technology. Magnetron sputtering and RF (radio frequency) sputtering deposition techniques are most suitable for fabricating shape memory thin films since it allows to control the alloy composition to a satisfactory extent. Specifically, well qualified shape memory thin films can be sputtered with their thickness in the range of 10 nm to 10 mm.

Figure 1:
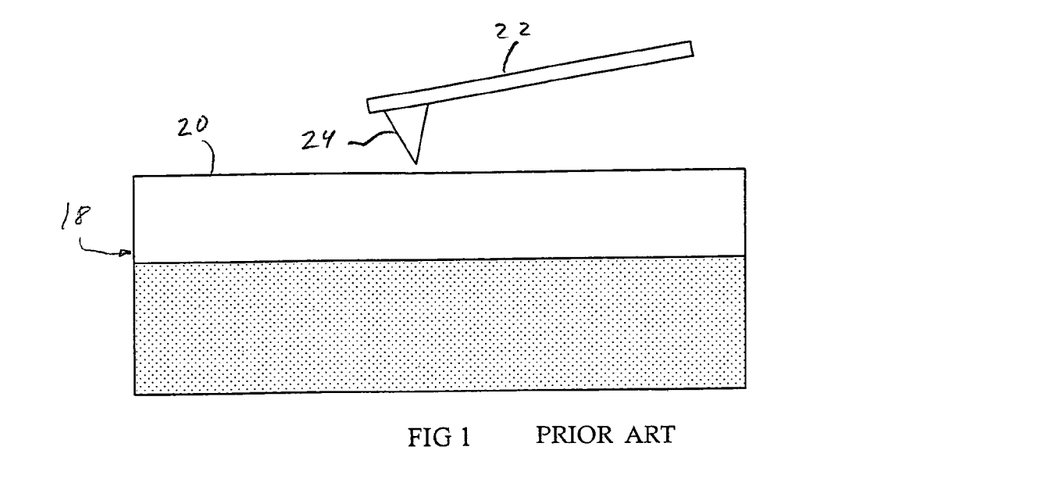
FIG. 1 is a schematic cross-section of a prior art SPM based data storage system.
Figure 2:
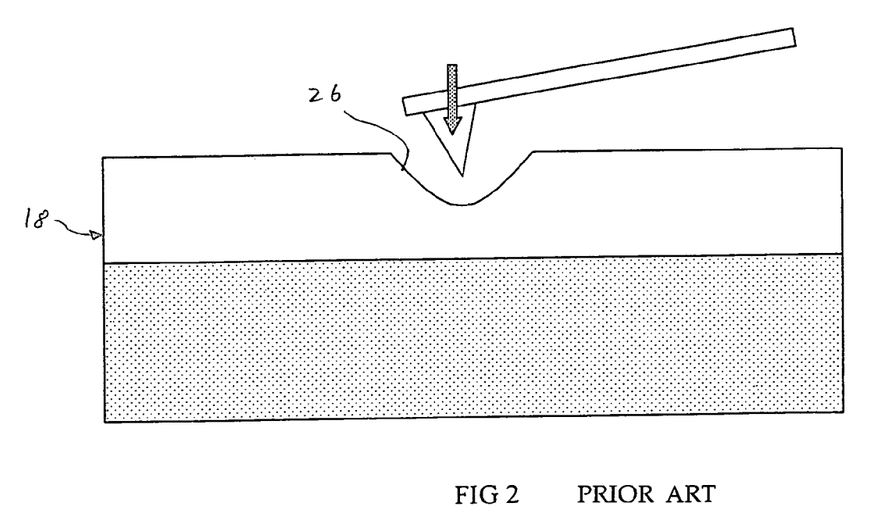
FIG. 2 is a schematic cross-section of a prior art storage medium and a scanning tip where data are written by mechanically indenting the storage medium.
Figure 3:
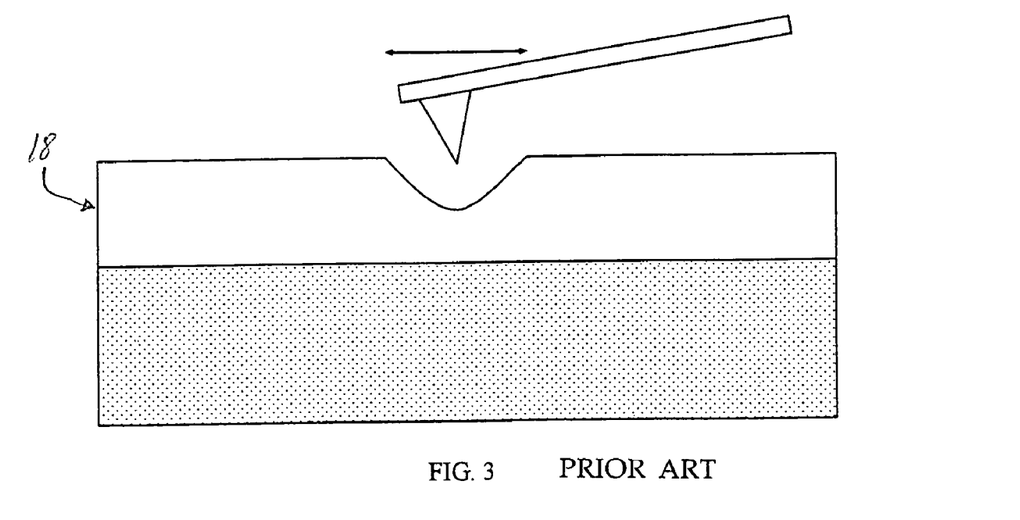
FIG. 3 is a schematic cross-section of a prior art storage medium and a scanning tip, where the indented data are read by locally scanning the storage medium with the same tip wherein heat flux between the tip and the medium is measured.
Figure 4:
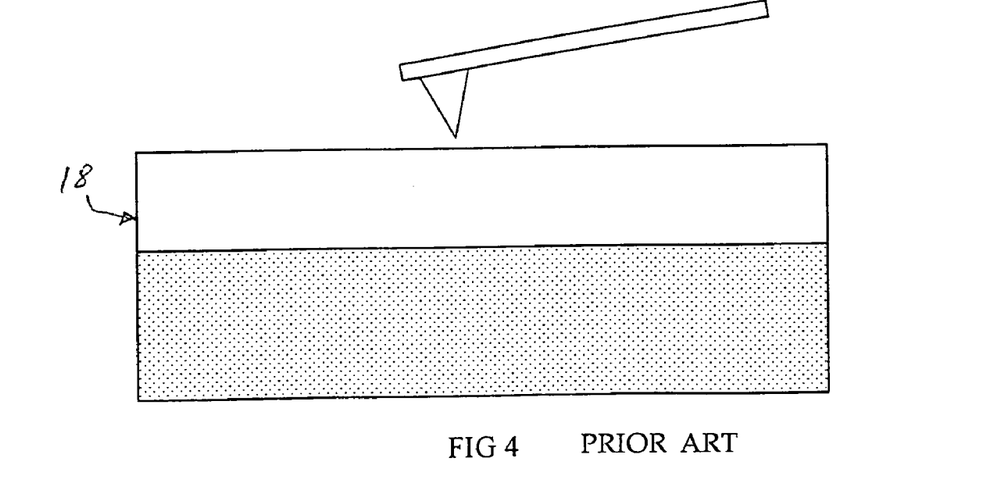
FIG. 4 is a schematic cross-section of a prior art storage medium and a scanning tip, where an indent is removed by locally heating the region close to the indent using the same scanning tip.
Figure 5:
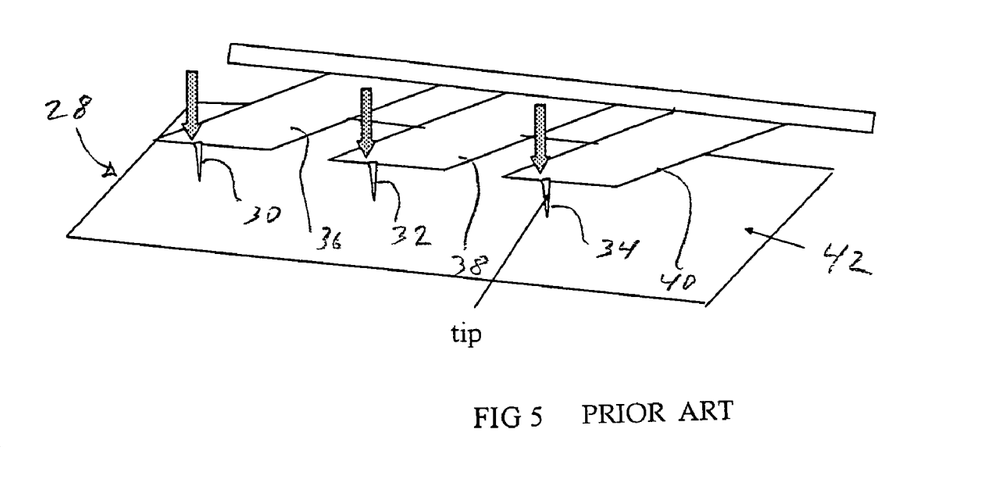
FIG. 5 is a schematic perspective view of a prior art data storage system having a scanning tip array positioned perpendicular to a storage medium.
Figure 6:
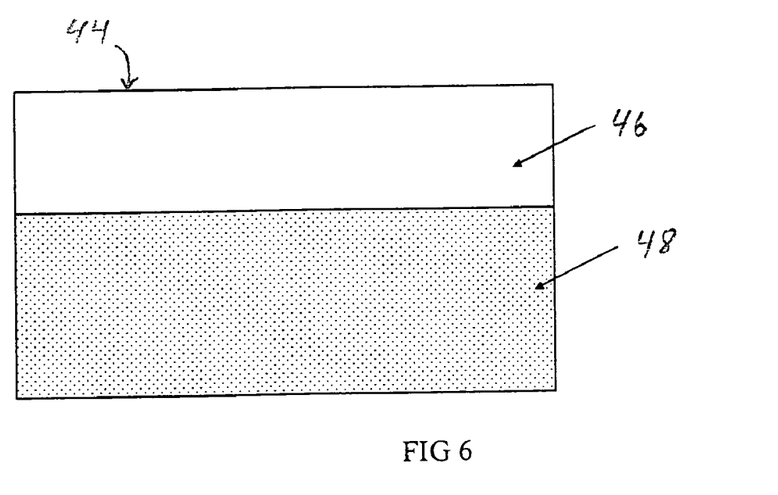
FIG. 6 is a schematic cross-section of a magnetic storage medium comprising a shape memory thin film and a substrate, according to the embodiment of present invention.

A cross section of a prior art SPM based data storage system 18 is shown schematically in FIG. 1. This system comprises a typical recording medium 20 which is made of plastic and a scanning tip array system 22 having one or more tips 24 facing directly toward the plastic recording medium. Electromagnetic actuation precisely moves the recording medium with respect to the scanning tip array, enabling each tip to write, read and erase the indented data on the medium in a designed pattern. By mechanically indenting the plastic medium with the scanning tip heated up to ~400° C., information is written as an indentation 26 in the medium surface as shown in the prior art device of FIG. 2. Using the same tip, the stored data can be detected by measuring difference of the heat flux between the tip and the medium surface when the tip is heated up to ~300° C. and scans inside the indent or across the medium surface as shown in the prior art device of FIG. 3. By locally heating the plastic medium to ~150° C., the indent can be filled and erased as shown in the prior art device of FIG. 4. FIG. 5 shows a schematic view of a prior art SPM based data storage system in which multiple tip assemblies 30-34 can write, read, and erase in parallel indentations on plastic medium 42 to realize the high data storage speed.

Figure 7:
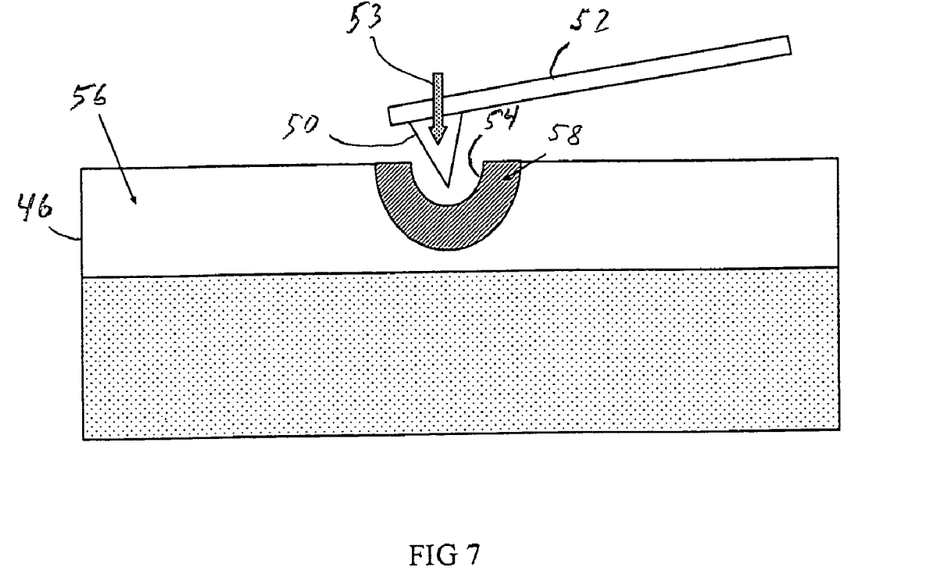
FIG. 7 is a schematic cross-section of a magnetic storage medium where the ferromagnetic area is induced by mechanically indenting the shape memory thin film medium according to the present invention.
Figure 8:
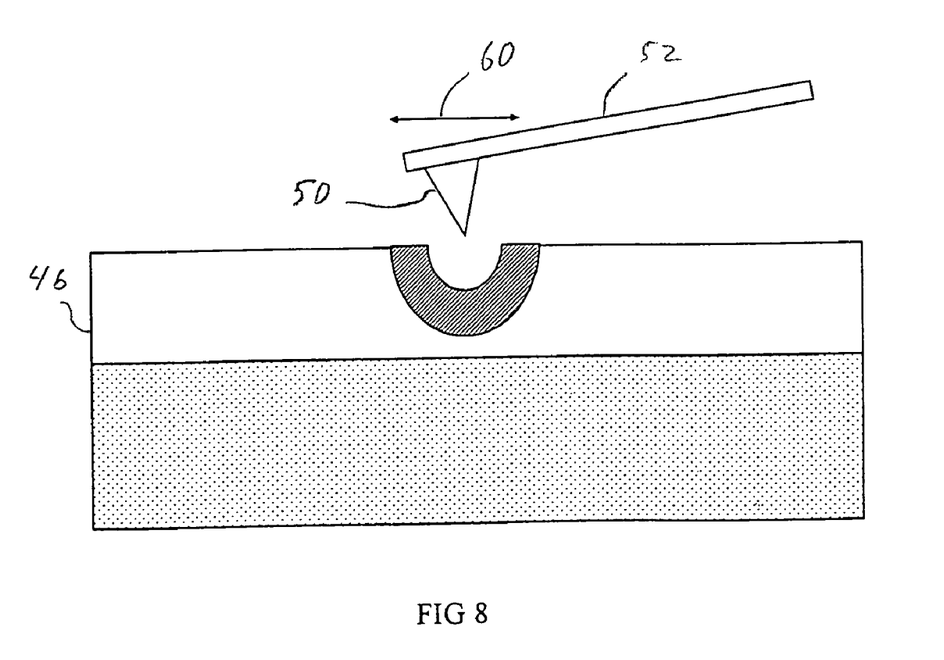
FIG. 8 is a schematic cross-section of a magnetic storage medium where a scanning tip is moving across the storage medium for reading the magnetic stored information according to the present invention.
Figure 9:
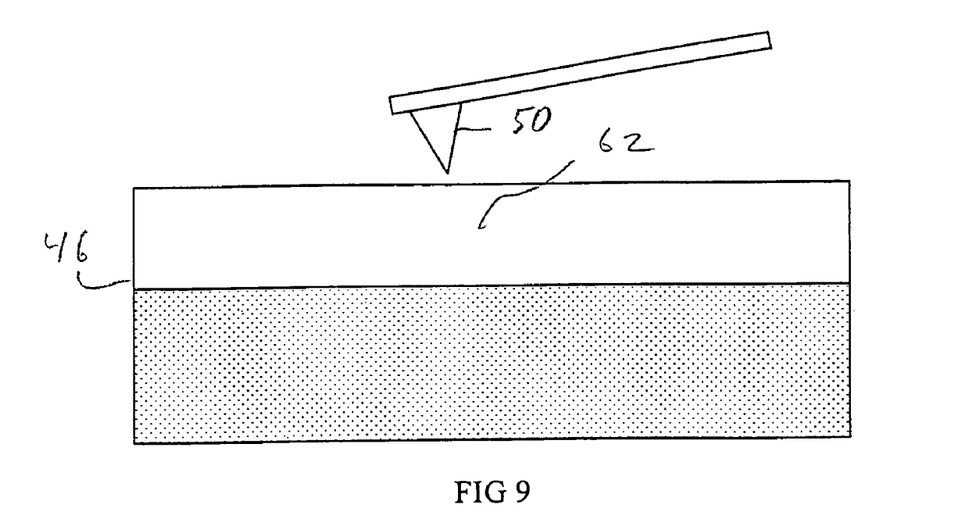
FIG. 9 is a schematic cross-section of a magnetic storage medium and a scanning tip, where the magnetic data are erased by locally applying a high amplitude, high frequency AC magnetic field a magnetic tip according to the present invention.

A magnetic data storage medium 44 in accordance with the present invention is shown in FIGS. 6-9. Storage medium 44 comprises a shape memory thin film 46 which is magnetron or RF sputtered to a thickness of ~500 nm on a supporting substrate 48 so that the SMTF is in its non-ferromagnetic parent phase. As shown in FIG. 7, one or more tips 50 are mounted by a corresponding number of cantilever beams 52 above medium 44 in the manner described in connection with FIG. 4.

For writing data on medium 44, suitable actuators (not shown) operated by means such as a computer bend the cantilevers down in the direction of the arrow 53 in FIG. 7 a sufficient distance to cause the tips to penetrate into storage medium 44 and form indents 54. Each tip is formed sharp with a radius of curvature as small as 10 nm so that each single indentation can be performed with a low load. Any desired indent pattern (resulting in a data stream) can be written with the tip arrays actuated in a predetermined order. With the indentation load controlled in the proper range, magnetization change is locally induced by martensitic transformation from the non-ferromagnetic parent phase portion 56 of the thin film to the ferromagnetic martensite phase portion 58 as shown in FIG. 7. In this way, digital information is represented as locally nanoindentation induced magnetic transition on FSMAs. In the next step, the cantilever is actuated to bend back up and move tip 50 out of the indentation to the position shown in FIG. 8. In this position the tip is in stand-by for subsequent actuation for forming another indentation after medium 44 and the tip is relatively moved laterally, as indicated by arrow 60 in FIG. 8, to other position.

To read the indentation induced magnetic data, the same grids of cantilevers are scanned across the SMTFs based storage medium where the magnetic information is stored such that an output signal (magnetic or electronic) is obtained through a suitable microcircuit system (not shown) which can convert information in the analog indents into digital data stream. In order to get quantitative information, a $Si_3N_4$ AFM cantilever is assembled with a tip which is covered with an evaporated 10 nm thick $Co_{80}Ni_{20}$ alloy film to make it sensitive for magnetic force detection and the magnetization of the tip is aligned in a perpendicular direction to the FSMAs surface. When the cantilever is vibrated at its natural resonance frequency the cantilever tip moves closer and further away from said medium surface.

Because the ferromagnetic tip has a high magnetic field gradient, the spin state can be swept in and out of resonance and the force interaction between a magnetic field gradient of the tip and the indentation induced magnetic moment on the medium surface will cause the phase of the cantilever motion to shift slightly. Therefore, the presence of the magnetic information can be retrieved (a ferromagnetic indent makes a digital 1 and the absence of such an indent is digital 0) by monitoring the shift phase on the natural oscillation frequency of the cantilever motion with a laser interferometer which will give an output signal to the microcircuit. The output signal can also be obtained by directly sensing the deflection of the cantilever. Such a reading mechanism is similar to that of magnetic force microscope (MFM), which has an intrinsic high resolution of down to 10 nm. However, the system of the present invention is used to generate an output signal for data processing rather than imaging as used in MFM. By optimizing the tip shape, detecting sensitivity on the magnetic force can be significantly improved.

To erase the magnetic information, the indentation induced magnetic information is first detected and identified by the microcircuit system. Then the data is erased by locally applying appropriate amplitude and duration of heat so that the local temperature exceeds the transition temperature and the indentation induced martensite is reversely transform to austenite as shown at in FIG. 9. This can be realized by adjusting the voltage values of a resistor assembled in the cantilever.

Figure 10:
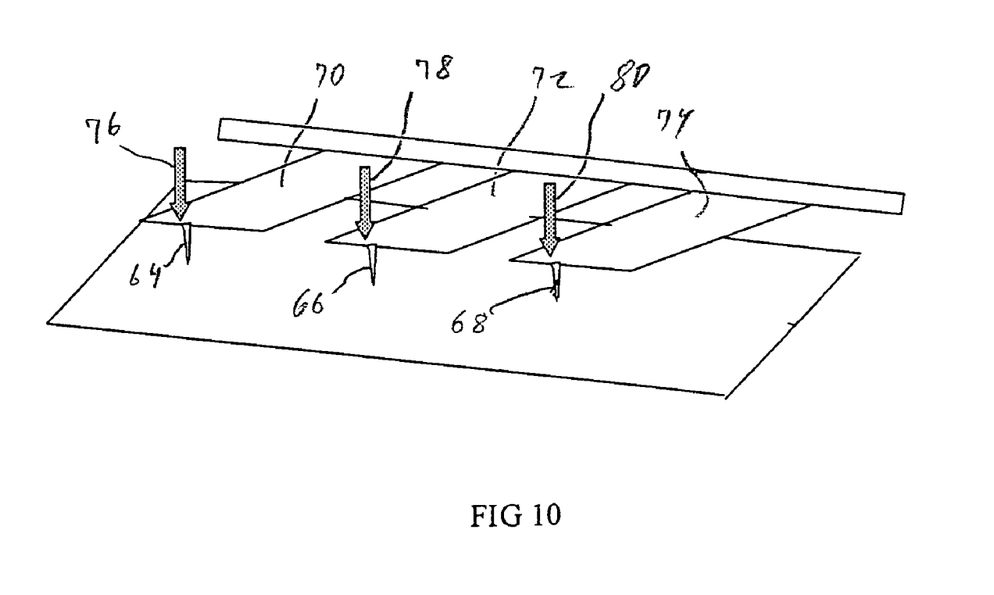
FIG. 10 is a schematic perspective view of a magnetic storage system comprising a scanning tip array positioned perpendicular to said SMTFs based data storage medium according to the present invention.

Another method to erase the data is to apply a high amplitude, high frequency AC magnetic field with a suitable external magnetocoil (not shown) so that the recorded signal can be erased by randomizing the magnetization. Multiple magnetic scanning tips 64-68 are assembled together on cantilevers 70-74 as shown in FIG. 10 to increase the data storage rate and the data density. The magnetization is shown by the arrows 76-480. Precise control is necessary to ensure the accurate leveling of the scanning tip array with respect to the SMTFs based data storage medium. In contrast with writing and reading on conventional medium, where the data can be placed everywhere on the medium, a critical issue of storing data on the present medium is that the electrical pulses used for writing, reading, and erasing data have to be synchronized correctly as the scanning tip moves over the data pattern. Similar synchronization has been realized in IBM's Millipede system.

Figure 11:
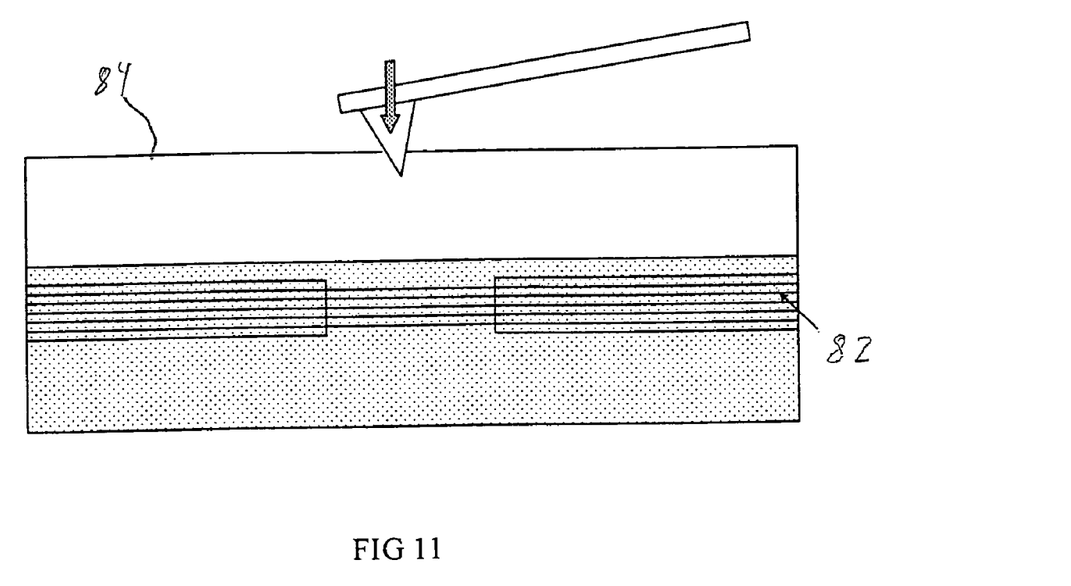
FIG. 11 is a schematic cross-section of the magnetic storage medium such that magnetic information is written by mechanically indenting the medium in an external magnetic field.

FIG. 11 shown another embodiment of the invention in which data storage is realized by indenting a data storage medium 84, made in accordance that disclosed for FIGS. 6-9, by means of an external magnetic field induced by current through a coil 82 mounted underneath the medium. The length and diameter of the coil are 3.0 and 0.2 mm, respectively. The distance between the medium surface and the magnetic coil is ~0.5 mm. The intensity of the magnetic field induced by the coil is in the range of 100-3000 Oe. After exposing the medium to the magnetic field sufficient so that the tip penetrates into the medium for a very short time, the tip is removed and electric current is switched off.

Figure 12:
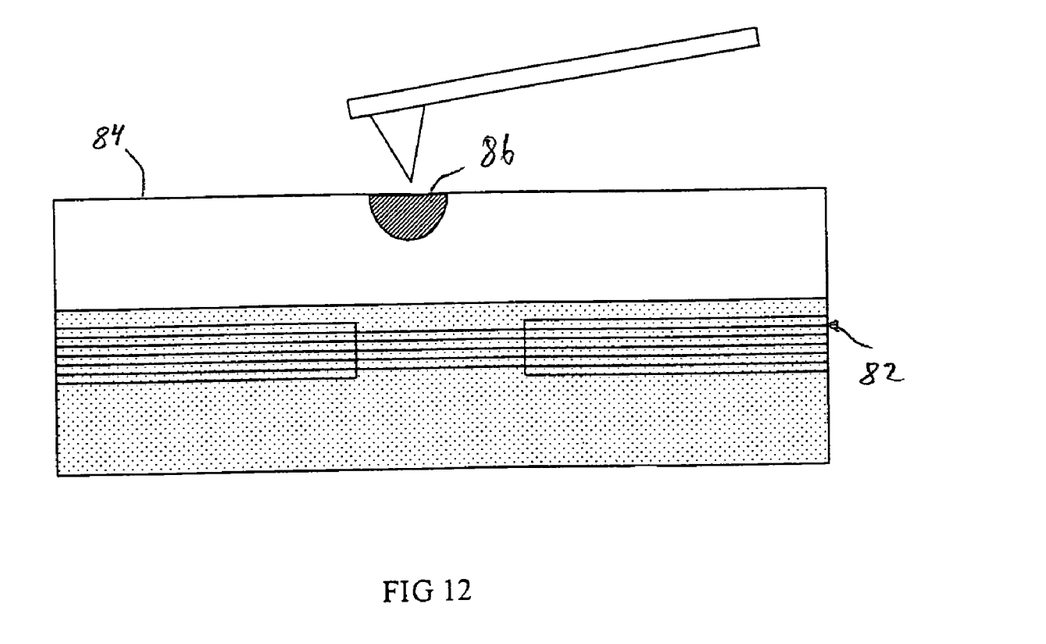
FIG. 12 is a schematic cross-section of the magnetic storage medium such that magnetic information is stored near an indent after moving the external magnetic field.

FIG. 12 shows the data storage medium 84 of FIG. 11 where the magnetic field freezing phenomenon appears at region 86 whereby the external magnetic field distribution is frozen and recorded in the medium. Afterwards, data reading is accomplished by using the magnetic force sensing system described above. One of the main advantages of this method is that properly controlling the indentation of the load enables the indent to completely recover with the magnetic information successfully stored.

Figure 13:
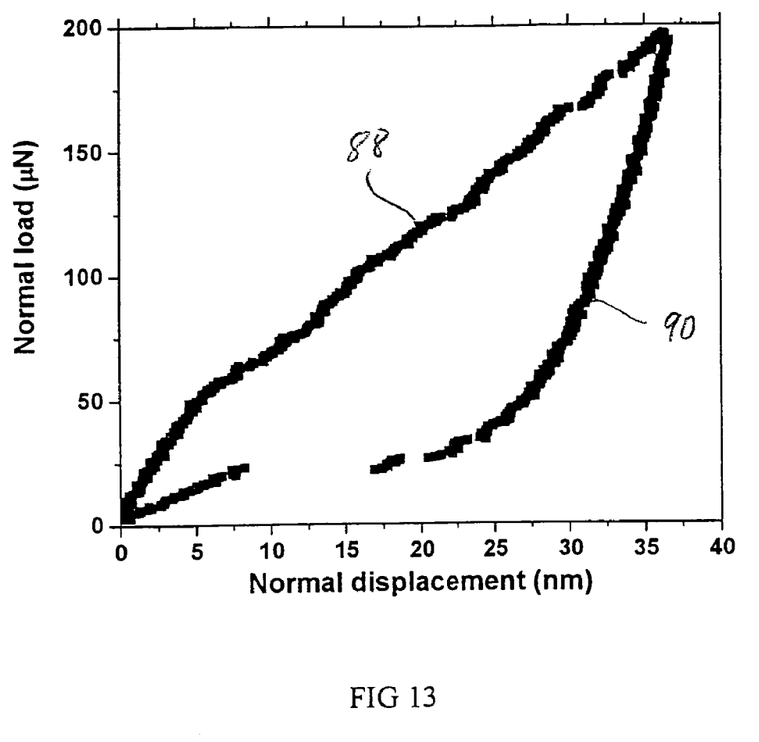
FIG. 13 is a load-displacement graph shows the indentation curve for an austenitic TiNi thin film with a ~700 nm radius diamond tip. After removing the indentation load, indentation depth as deep as 34 nm recovers completely.

In the load-displacement graph of FIG. 13 shows the indentation curve for an austenitic TiNi thin film with a ~700 nm radius diamond tip. After removing the indentation load, indentation depth as deep as 34 nm recovers completely. The curves 88 and 90 show the complete pseudoelasticity of the austenitic TiNi thin film under nanoindentation. This zero-wear property of SMTFs significantly improves duration of the data storage medium.

Figure 14:
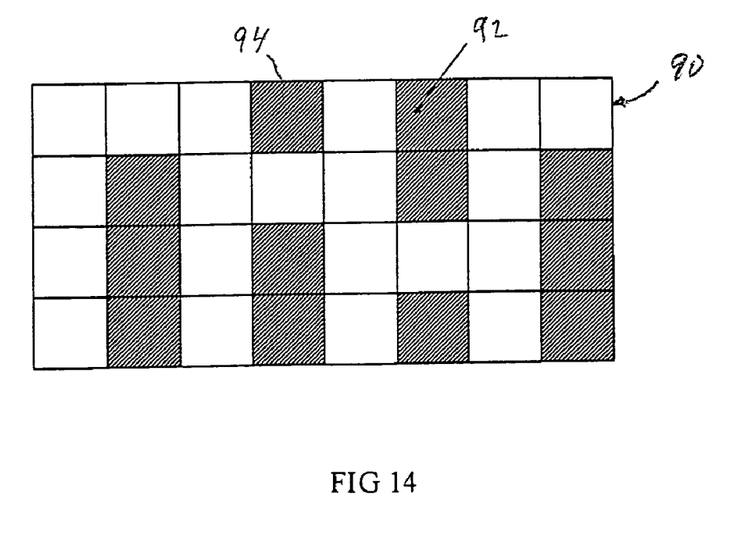
FIG. 14 is a schematic top view of a portion of the magnetic storage medium of the thin film of FIG. 13.

FIG. 14 is a schematic top view of a portion of FIG. 13 of the magnetic data storage medium 90 of the invention. This view illustrates different areas 92, 94 (shown as squares for purposes of explanation) of the data storage medium after magnetic writing as described above. Each of the indentation-induced magnetic data areas represents a single bit for magnetic recording. The centers of the magnetic data are separated by a distance of approximately 50 nm and are arranged in a grid-like manner, which in turn produces a recording density of approximately 300 Gbit/in$^2$.

Figure 15:
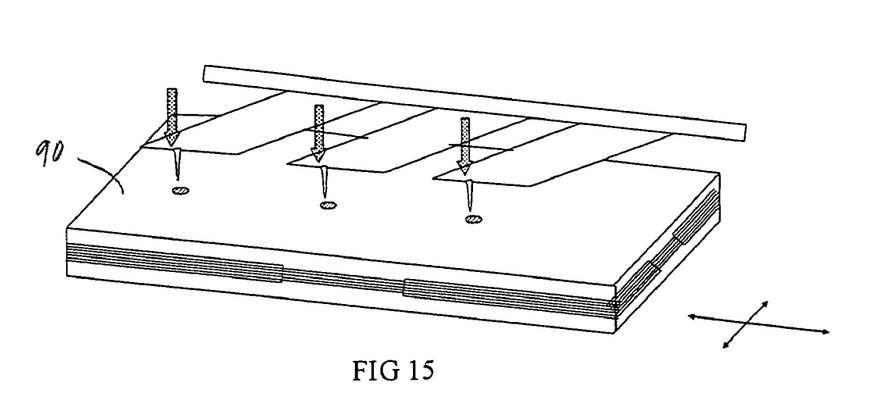
FIG. 15 is a schematic perspective view of a magnetic storage medium used in the invention.

FIG. 15 is a schematic perspective view of a magnetic storage medium and a plurality of scanning tips of the invention. In the arrangement the magnetic data is erased by locally applying a high amplitude, high frequency AC magnetic field with a magnetic tip.

As will be realized, the present invention is capable of use in various other combinations and environments, and its several details are capable of being modified in various respects such as memory for digital camera, camcorder and other portable digital devices that need capability to memorize magnetic at any arbitrary point with mechanical stress triggered, all without departing from the invention. Accordingly, the drawings and description are to be considered as illustrative in nature, and not as restrictive.

The invention claimed is:

1. A magnetic data storage system comprising a storage medium having a surface, the medium being comprised of a shape memory alloy material which transforms from a non-ferromagnetic austenite crystalline phase to a ferromagnetic martensite crystalline phase responsive to a mechanical stress, a scanning tip, and an operating structure for moving the tip against the surface to cause the tip to apply a stress which is sufficient to form an indent in the surface while transforming an area of the medium surrounding the indent into the ferromagnetic martensite crystalline phase with the transformed area representing a data bit.

2. A magnetic data storage system as in claim 1 in which the storage medium further comprises a substrate, the material is carried on the substrate, and the material comprises a sputter-deposited thin film in the non-ferromagnetic austenite crystalline phase.

3. A magnetic data storage system as in claim 2 the operating structure comprises a scanning tip array system having a plurality of scanning tips and a plurality of cantilevers, each cantilever carrying a scanning tip, each scanning tip being covered with a ferromagnetic thin film.

4. A magnetic data storage system as in claim 3 in which thin film directly faces the scanning tip array system.

5. A magnetic data storage system as in claim 2 in which the thin film has a thickness of approximately 500 nm.

6. A magnetic data storage system as in claim 2 and further comprising means for exerting relative motion between the surface and the scanning tip array, the relative motion enabling writing, reading, and erasing of the data bit on the medium.

7. A magnetic data storage system as in claim 1 in which the tip comprises a means for applying magnetic field to the medium.

8. A method of storing data comprising the steps of providing a storage medium comprised of a shape memory alloy material, the alloy being in a non-ferromagnetic austenite crystalline phase, and applying a stress on a data storing area of the medium sufficient to transform the area of material to a ferromagnetic martensite crystalline phase with the transformed area representing a stored data bit.

9. A method of storing data comprising the steps of providing a storage medium comprised of a shape memory alloy material, the alloy being in a non-ferromagnetic austenite crystalline phase, and applying a magnetic field on an area of the medium sufficient to transform the material to a ferromagnetic martensite crystalline phase with the transformed area representing a stored data bit.

10. A method as in claim 8 and further comprising the step of providing a scanning tip, scanning the scanning tip array system with respect to the transformed area, and generating an read output signal when the tip is scanned over the transformed area.

11. A method as in claim 8 and further comprising the step of erasing the stored data bit a step selected from the group consisting of 1) heating the transformed area to the material's crystalline phase change transition temperature and 2) applying a high amplitude, high frequency AC magnetic field to the transformed area.

12. A method as in claim 8 in which the stress is applied by mechanically indenting the data storing area in an external magnetic field, removing the mechanical stress and the external magnetic field, and freezing the external magnetic field.

* * * * *

UNITED STATES PATENT AND TRADEMARK OFFICE
CERTIFICATE OF CORRECTION

PATENT NO. : 7,586,828 B1
APPLICATION NO. : 10/972759
DATED : September 8, 2009
INVENTOR(S) : Xiaoguang Ma It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1287 days.

Signed and Sealed this

Twenty-first Day of September, 2010

David J. Kappos
*Director of the United States Patent and Trademark Office*